Aug. 23, 1932.    E. H. BLAZER    1,873,270
PIN FASTENER
Filed Oct. 14, 1931
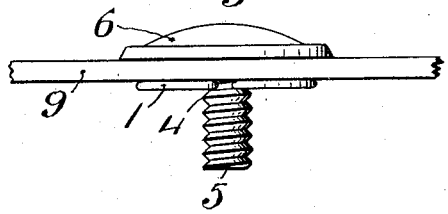
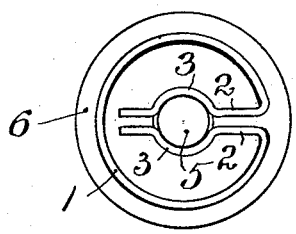
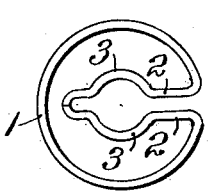
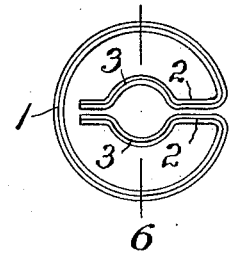
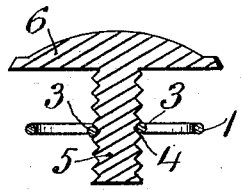
INVENTOR
Earl H. Blazer
BY Warren D. House
His ATTORNEY
Witness
H. Vernon Olson.

Patented Aug. 23, 1932

1,873,270

UNITED STATES PATENT OFFICE

EARL H. BLAZER, OF MERRIAM, KANSAS

PIN FASTENER

Application filed October 14, 1931. Serial No. 563,678.

My invention relates to improvements in pin fasteners. It is particularly adapted for fastening to garments ornamental pins or similar devices having threaded shanks from which the securing nuts have been detached and become lost.

The object of my invention is to provide a pin fastener of the kind described, which is simple, cheap, durable, easily applied and detached, and which will securely hold to the garment the pin to which it is attached.

The novel features of my invention are hereinafter fully described and claimed.

In the accompanying drawing, which illustrates my invention,

Fig. 1 is a side elevation of a pin fastened with my improved fastener to a garment.

Fig. 2 is an end view of a pin having mounted on it my improved fastener.

Fig. 3 is a central vertical sectional view of what is shown in Fig. 2, the wire of the fastener being circular in section.

Fig. 4 is a plan view of the fastener, shown in Figs. 1, 2 and 3, having a clip thereon.

Fig. 5 is a plan view of the fastener as formed from wire square in cross section.

Fig. 6 is a section on the line 6—6 of Fig. 5.

Fig. 7 is a modification in which the ends of the wire abut against each other.

Fig. 8 is a plan view of the clip, enlarged.

Similar reference characters designate similar parts in the different views.

My improved fastener is composed, preferably, of resilient wire of any desired cross section, as circular, as shown in Fig. 3, or square, as shown in Fig. 6.

The wire is formed into a transversely divided ring 1 from which inwardly extend two arms 2 which are respectively provided with two arcuate portions 3 having their concave sides next to each other, and which are adapted to fit between the threads 4 and to embrace opposite sides respectively of a threaded shank 5 of a pin 6, as shown in Figs. 1, 2 and 3.

The arms 2 where they merge into the ring 1 are so spaced as to be sprung away from each other when the fastener is applied transversely, as shown in Figs. 1 to 3, whereby the arcuate portions 3 will tightly embrace the shank 5.

To limit such spreading, and to increase the clamping effect of the fastener on the shank, means may be provided for limiting the expansion of the arms, as by a small clip 7, Figs. 4 and 8, or, as shown in Fig. 7, the ends of the arms 2 may abut against each other and be fastened together, as by soldering or welding. The clip 7 may be of any suitable form and material, that shown being a plate having two holes 8, Fig. 8, through which the arms 2 extend.

Such connection between the arms, as by the clip 7, or by integrally uniting the arms by soldering or welding, serves the additional function of strengthening the fastener and reducing the liability of its becoming distorted.

In applying the fastener to a pin, the pin has its shank 5 inserted through a garment 9, as the lapel of a coat. The shank 5 is then passed between the arms 2 to a position in which the arcuate portions 3 will be disposed between the threads 4 and embrace opposite sides of the shank, Figs. 1, 2 and 3. When used, the clip 7 is applied to the arms 2 before the fastener is mounted on the shank 5.

The fastener is adapted to be used as a substitute for the usual nut or other threaded device which serves to hold the pin, and unlike such nut, it can be applied to the pin without having to be screwed on, and, due to its clamping effect, it is also adapted for use with pins, or similar articles, having smooth as well as threaded shanks.

I do not limit my invention to the specific structure shown, as many modifications, within the scope of the appended claims, may be made without departing from the spirit of my invention.

What I claim is:—

1. A pin fastener comprising a ring having two inwardly extending resilient arms respectively provided with two arcuate portions adapted to fit between the threads and to embrace opposite sides of a threaded shank of a pin, and a clasp adapted to releasably embrace said arms to limit their expansion.

2. A pin fastener comprising a resilient transversely divided ring having its end portions forming inwardly extending arms spaced apart so as to admit between them a threaded shank of a pin and respectively provided with two arcuate portions adapted to fit between the threads and to embrace opposite sides of said shank, and a clip engaging said arms and limiting their relative movement apart.

In testimony whereof I have signed my name to this specification.

EARL H. BLAZER.